US009245256B2

(12) United States Patent  (10) Patent No.: US 9,245,256 B2
Saraya  (45) Date of Patent: Jan. 26, 2016

(54) ASSIGNING AND MANAGING REVIEWS OF A COMPUTING FILE

(71) Applicant: International Business Machines Corporation, Armonk, NY (US)

(72) Inventor: Siddharth K Saraya, Burdwan (IN)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 13/972,189

(22) Filed: Aug. 21, 2013

(65) Prior Publication Data

US 2015/0058282 A1    Feb. 26, 2015

(51) Int. Cl.
G06F 17/30    (2006.01)
G06Q 10/10    (2012.01)
G06Q 10/06    (2012.01)

(52) U.S. Cl.
CPC .......... *G06Q 10/103* (2013.01); *G06Q 10/0631* (2013.01)

(58) Field of Classification Search
CPC ... G06Q 10/10; G06Q 10/06; G06F 17/30011
USPC ................ 707/608, 792, 4, 8; 715/835, 751
See application file for complete search history.

(56) References Cited

U.S. PATENT DOCUMENTS

| 5,706,452 | A * | 1/1998 | Ivanov | 715/751 |
|---|---|---|---|---|
| 7,818,678 | B2 | 10/2010 | Massand | |
| 7,904,802 | B1 | 3/2011 | Kolawa et al. | |
| 2004/0034631 | A1* | 2/2004 | Julliard et al. | 707/4 |
| 2006/0184529 | A1* | 8/2006 | Berg et al. | 707/8 |
| 2006/0190988 | A1* | 8/2006 | Adams et al. | 726/2 |
| 2008/0196000 | A1* | 8/2008 | Fernandez-Ivern et al. | 717/101 |
| 2009/0063247 | A1* | 3/2009 | Burgess et al. | 705/10 |
| 2009/0094086 | A1 | 4/2009 | Bruno et al. | |
| 2010/0325584 | A1* | 12/2010 | McKenzie | 715/835 |
| 2011/0225203 | A1* | 9/2011 | Hart-Davidson et al. | 707/792 |
| 2012/0150851 | A1 | 6/2012 | Agrawal | |
| 2012/0159355 | A1 | 6/2012 | Berg et al. | |
| 2014/0317147 | A1* | 10/2014 | Wu | 707/792 |

FOREIGN PATENT DOCUMENTS

WO    2009145941 A1    12/2009

OTHER PUBLICATIONS

"Method and System for Assigning Sections of a Document in a Collaborative Document Editing Environment", IP.com No. IPCOM000208293D, IP.com Electronic Publication: Jun. 29, 2011.
"Code, Document & Artifact Review—Collaborator", http://smeartbear.com/products/software-development/code-review/steamlined-code-review, 2013.

\* cited by examiner

*Primary Examiner* — Jeffrey A Burke
*Assistant Examiner* — Thong Vu
(74) *Attorney, Agent, or Firm* — Maeve McCarthy

(57) ABSTRACT

Embodiments of the present invention disclose a method, computer program product, and computer system for managing reviews of a computing file. The method includes a computer receiving a computing file, the computing file containing software program functions. The computing system receives a list of one or more reviewers to review the computing file. The computer parses the computing file by function. The computer receives an assignment of at least one of the one or more reviewers to at least one function within the computing file. The computer sends a request to review the computing file to the at least one of the one or more reviewers assigned.

14 Claims, 3 Drawing Sheets

ASSIGNING AND MANAGING REVIEWS OF A COMPUTING FILE

FIELD OF THE INVENTION

The present invention relates generally to the field of software file review and more particularly to assigning and managing reviews of a computing file.

BACKGROUND OF THE INVENTION

Review of text and software program files has advanced from co-workers passing around a hardcopy or paper version for a sequential review to the use of computing tools and software programs that implement simultaneous review. With today's widespread computing environment, review of a work product, including text documents, program files, or software code, can occur practically anywhere at any time with multiple reviewers. Collaborative file review applications provide multiple users the ability to simultaneously access and review a file. Typically, a document or file owner assigns multiple reviewers to work with the file. A number of comments, suggested changes, or edits may occur in a section of the file, requiring the file owner to sift through comments and determine which, of many, to incorporate into the file. In some cases, sections of files may inadvertently not be reviewed. It is often up to the file owner to decide to accept comments, changes, resolve conflicts, and ensure that a file is reviewed in full, and completed in a timely and effective manner, thus providing a quality product upon completion.

SUMMARY

Embodiments of the present invention disclose a method, computer program product, and computer system for managing reviews of a computing file. The method includes a computer receiving a computing file, the computing file containing software program functions. The computing system receives a list of one or more reviewers to review the computing file. The computer parses the computing file by function. The computer receives an assignment of at least one of the one or more reviewers to at least one function within the computing file. The computer sends a request to review the computing file to the at least one of the one or more reviewers assigned.

DETAILED DESCRIPTION

Figure 1:
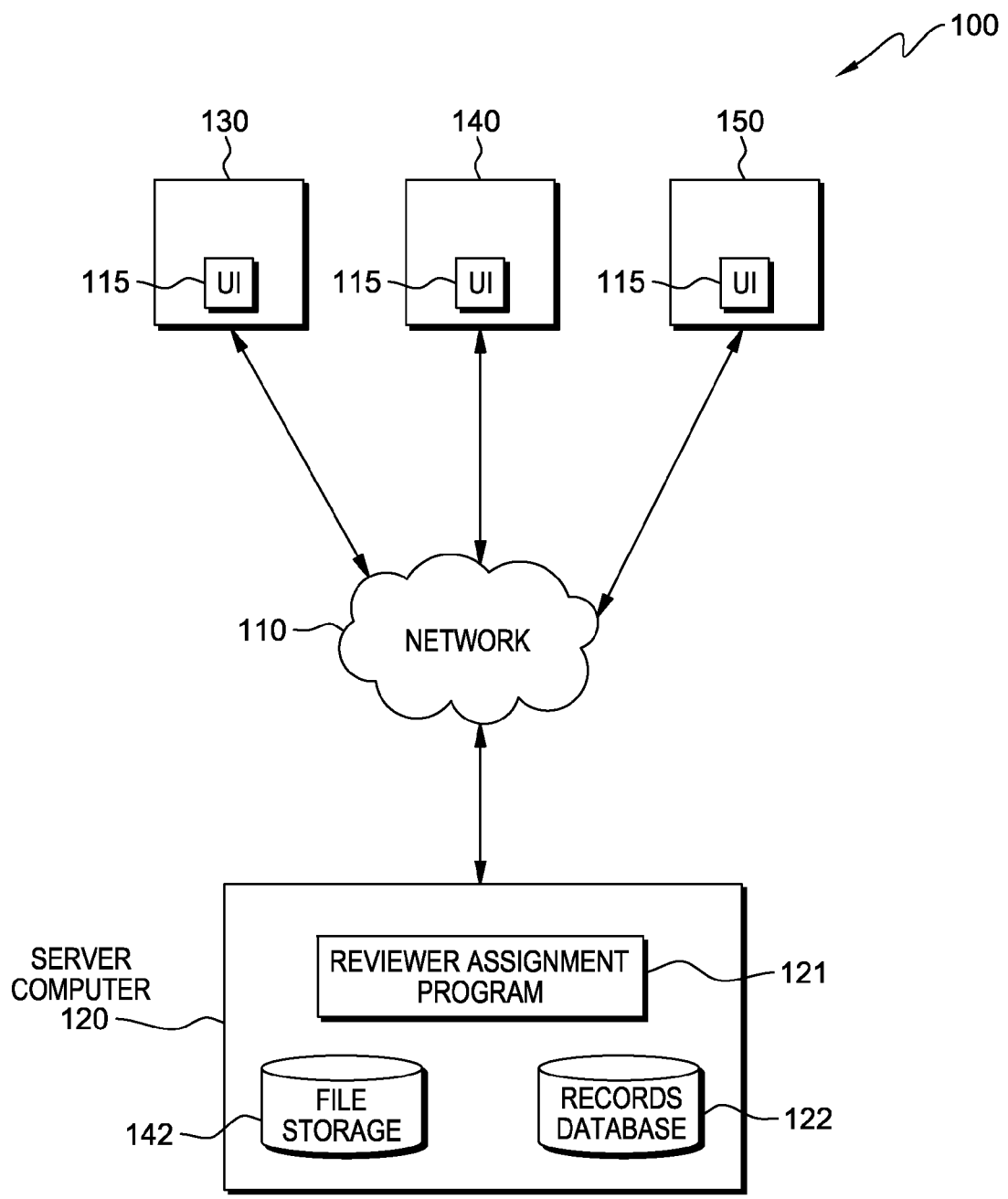
FIG. 1 is a functional block diagram illustrating a distributed data processing environment, in accordance with an embodiment of the present invention.

In collaborative, simultaneous editing or review of a computing file, for example, a document or a software program, current applications can allow file owners to assign reviewers to review the file. Some applications display comments and changes by reviewer, by date, time or location. In these applications, it is the responsibility of the file owner to ensure a comprehensive and complete review of a product to provide an optimized final product, whether a document or software program, by incorporating comments and changes suggested by reviewers.

Embodiments of the present invention recognize that opportunities exist to provide complete, detailed reviewer coverage of a file while simultaneously increasing the efficiency of reviewers by providing assignment of reviewers as precisely as by function, method, or line to manage a program file review. File owners can assign a specific reviewer or reviews by selecting functions or lines. Various embodiments of the present invention provide automated communication of assignment and a method of quickly accessing assigned sections of a file. This targeted assignment by function or by line aids in multiple reviewer review control. Review assignment by function, in a software program, or by line, in a text file, ensures all critical functions or lines are reviewed, and allows assignment of specific experts or reviewers to targeted sections of the file based on their expertise. Embodiments of the present invention enable a thorough file review with minimal duplication of review effort because sections, lines or functions may be only reviewed by as many reviewers as defined by owner.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed data processing environment, generally designated 100, in accordance with one embodiment of the present invention.

Distributed data processing environment 100 includes server computer 120, user computing devices 130, 140 and 150, all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between server computer 120, and user computing devices 130, 140, and 150.

Server computer 120 may be, for example, a management server, a web server, or any other electronic device or computer system capable of receiving and sending data to user computing devices 130, 140, and 150 via network 110. In various embodiments of the present invention, server computer 120 can represent a computing system utilizing clustered computers and components to act as a single pool of seamless resources when accessed through a network. Data centers and cloud computing environments are two commonly known examples of implementations for these various embodiments. Server computer 120 may include internal and external hardware components, as depicted and described in further detail with respect to FIG. 3.

Server computer 120 includes reviewer assignment program 121, file storage 142, and records database 122. File storage 142, which stores computing files for review, may be in memory or persistent storage in server computer 120 or reside in removable mass storage devices, for example, optical or magnetic disks, hard drives, or other removable storage such as thumb drives or smartcards. A computing file can be a document, software code, or a program. In various embodiments of the present invention, a computing file may be in another electronic medium, such as video, audio, or animation, for example. In some embodiments, file storage 142 may reside in one or more external storage devices. In other embodiments, file storage 142 can be located within distributed data processing environment 100 on a user computing device or otherwise accessible by reviewer assignment program 121 via network 110.

Records database 122 can store records for reviewer assignment program 121. Records stored in records database 122 can contain information for files for review, including file reviewers by name, electronic ID, e-mail for example, and file reviewer assignments by file, by function or by line. Records database 122 can reside in memory or persistent storage in server computer 120 or can exist in removable storage medium, including hard disks, magnetic tapes or thumb drives, for example. Record database 122 may also reside in external storage devices. In another embodiment, record database 122 is a database management system (DBMS). A database management system is software designed to provide definition, creation, querying, updating, and administration of database models. Database model embodiments include, but are not limited to: (i) hierarchical database model; (ii) network model; (iii) relational model; (iv) entity-relationship model; (v) object model; (vi) document model; and (vii) object-relational model.

User computing devices 130, 140, and 150 each may be a laptop computer, a tablet computer, a netbook computer, a personal computer (PC), a desktop computer, a personal digital assistant (PDA), a smart phone, or any programmable electronic device capable of communicating with server computer 120 and with each other over network 110. User computing devices 130, 140 and 150 include respective user interfaces (UIs) 115 for interfacing with reviewer assignment program 121. UIs 115 may be, for example, a graphical user interface (GUI) or a web user interface (WUI) and can display text, documents, web browser windows, user options, application interfaces, and instructions for operation. User computing devices 130, 140, and 150 may be operated by a file owner, a reviewer, a developer, a programmer, any other user or software operating user computing devices 130, 140, or 150 within distributed data processing environment 100

Reviewer assignment program 121 receives a computing file via network 110. The file may be received from an operator of user computing device 130, 140, or 150, for example, a file owner, a manager, an administrator, or another operator with permission and qualifications to upload, open, and assign reviewers to review a computing file, specifically, by function or by line. Reviewer assignment program 121 can communicate via network 110, using, for example, email, instant message or text message with users operating user computing devices 130, 140, or 150. Upon receiving communication from reviewer assignment program 121, reviewers operating user computing devices 130, 140, or 150 can see assignments, directly locate individual assignments within a file, and view specified assignment status by line or by function on UIs 115. In one embodiment, one function of reviewer assignment program 121 allows a file owner operating on one of user computing devices 130, 140, or 150 to set reviewer assignment at function, method or line level within the file. The type of review, by line, by method, or by function, would be based on the file type to be reviewed. A software program file, a Java file, for example, can be reviewed at the functional level. As will be appreciated by one skilled in the art, hereinafter a method may be a function in various computing languages, and is included in discussions as a function. In one embodiment of the present invention, a text file or text document, for example, could be reviewed at the line level. Reviewer assignment program 121 can display the reviewer assignments to a reviewer operating on user computing device 130, 140, or 150 by: reviewer, file, function or line, and review status.

Figure 2:
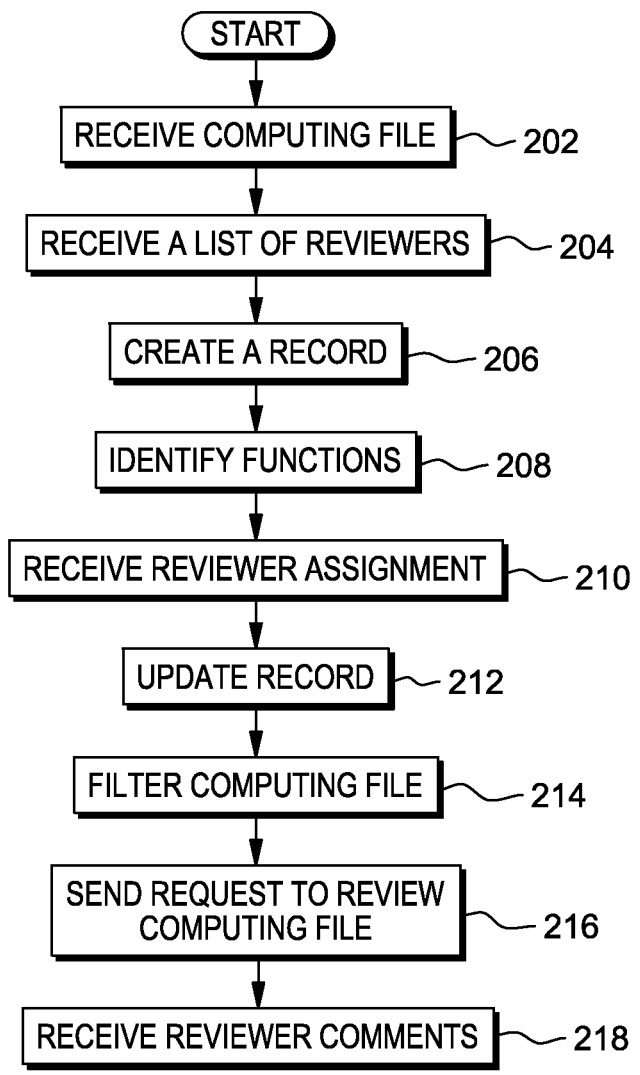
FIG. 2 is a flowchart depicting operational steps of a reviewer assignment program on a server computer within the distributed data processing environment of FIG. 1, for assigning reviewers to a file by function, in accordance with an embodiment of the present invention.

FIG. 2 is a flowchart depicting operational steps of reviewer assignment program 121 for assigning reviewers to a file by function, in accordance with an embodiment of the present invention.

In step 202, reviewer assignment program 121 receives a computing file. A computing file may be uploaded from a user computing device, for example, user computing device 150. An operator of user computing device 150, such as a computing file owner, can determine if the computing file is to be reviewed and can input a unique identification or ID for each computing file to be reviewed.

In step 204, reviewer assignment program 121 receives a list of reviewers of the computing file. In one embodiment, a list of reviewers to be assigned to review a computing file may be received from a computing file owner operating user computing device 150. In other embodiments, the list of reviewers to be assigned may be received from one or more of the following, including, but not limited to: a stored reviewers file, such as a database; a flat file, possibly stored on server computer 120; or stored in environmental variables. The list of reviewers to be assigned may be input by the computing file owner, a manager or administrator operating a user computing device within distributed data processing environment 100.

In step 206, reviewer assignment program 121 creates a record of the reviewer assignment to the computing file. The records of the computing file can include, but are not limited to, information such as: the file name, the file identification, a reviewer name and a reviewer's electronic identification. In some embodiments, the reviewer's electronic identification, such as an email address, may be used for communication of assignments. Records for computing files can be stored in records database 122 on server computer 120, although in other embodiments the records can be stored on another computing device within distributed data processing environment 100 (not shown).

In step 208, reviewer assignment program 121 identifies functions in the computing file. Reviewer assignment program 121 parses the computing file to identify and separate functions. Functions offer the ability for programmers to group program code that performs a specific task into a single unit that may be used repeatedly in a program. Examples of functions, in a Java program, include built-in functions e.g. "documents.write( )", "alert( )", and "parseInt( )." Programmer created functions or software program functions are defined by a function statement using a name, a list of parameters, and a command block that defines the function capabilities.

In step 210, reviewer assignment program 121 receives the reviewer assignment by function. The review assignment can aide in program file review management. In one embodiment of the present invention, reviewer assignment program 121 can display a list of reviewers on UI 115 on user computing device 150 and can provide, for example, a pull down list of reviewers assigned to a computing file. A computing file owner may select a reviewer by right clicking on the desired reviewer or reviewers to assign for the identified function. The computing file owner can move to the next function to be reviewed to select and save a selection of desired reviewer or reviewers for the next function. In various embodiments of the invention, the computing file owner may select several functions to be reviewed and assign them to a reviewer or set of reviewers. In another embodiment of the present invention, reviewer assignment program 121 can maintain a list of reviewers who have previously reviewed a similar function or the same function. In another embodiment, when the computing file owner has completed assigning desired functions to be reviewed, computing file owner can save the selections, for example, by selecting the option "save reviewer." In an alternate embodiment of the invention, reviewer assignment program 121 can assign reviewers by line in a text document.

In step 212, reviewer assignment program 121 updates records stored in records database 122 to include the reviewer assignment by function.

In step 214, reviewer assignment program 121 filters the computing file. Review assignment program 121 can filter a computing file by reviewer, by function or by both reviewer and function. For example, a filter of the computing file by reviewer can provide a listing of all functions assigned to the reviewer. In an exemplary embodiment of the present invention, reviewer assignment program 121 creates a link between a reviewer and the reviewer's assigned function in the computing file. In some embodiments, the link will contain the electronic reviewer's identification. When the file is accessed by a reviewer, selecting the filter by reviewer name can locate and display an assigned function for the reviewer. Similarly, a filter of the computing file by a function to be reviewed can provide a listing of the reviewer or reviewers assigned to that function.

In step 216, reviewer assignment program 121 sends a request to review the computing file to assigned reviewer(s). In various embodiments of the present invention, reviewer assignment program 121 can communicate to the reviewer a request to review the computing file using provided reviewer electronic identification. The request can be in the form of e-mail, instant message or text message, for example. The communication may include the computing file and electronic identification of the computing file's owner requesting the review. The communication may also include the functions requested for review. In other various embodiments, some functions may not be assigned to specific reviewers and can be reviewed by any reviewer assigned to the computing file.

In step 218, review assignment program 121 receives reviewer comments. Reviewer comments may be recorded by user, or reviewer electronic identification or name, by file, and by function. In some embodiments, the reviewer comments may be saved by date and time. In another embodiment, the review and comments may be saved by user, or reviewer electronic identification or name, by file and by line or section, for example, in the case of text files. In various embodiments of the present invention, when reviewer assignment program 121 receives reviewer comments, the program can update the status to reflect the review for that function as "reviewed", for example, and save the review comments with the function. Information regarding a function or the computing file status can be stored in records database 122 with reviewer assigned information and computing file information. A status, for example, could show as not reviewed, reviewed and complete. In some embodiments of the present invention, a function that is reviewed by an individual reviewer, but has not been accepted or closed by the computing file owner can be displayed as "reviewed." Further, if a computing file owner chooses to incorporate reviewer's comments and acts to add the comments to the file, upon the file owner saving the changes, the function status may become "complete," for example.

Figure 3:
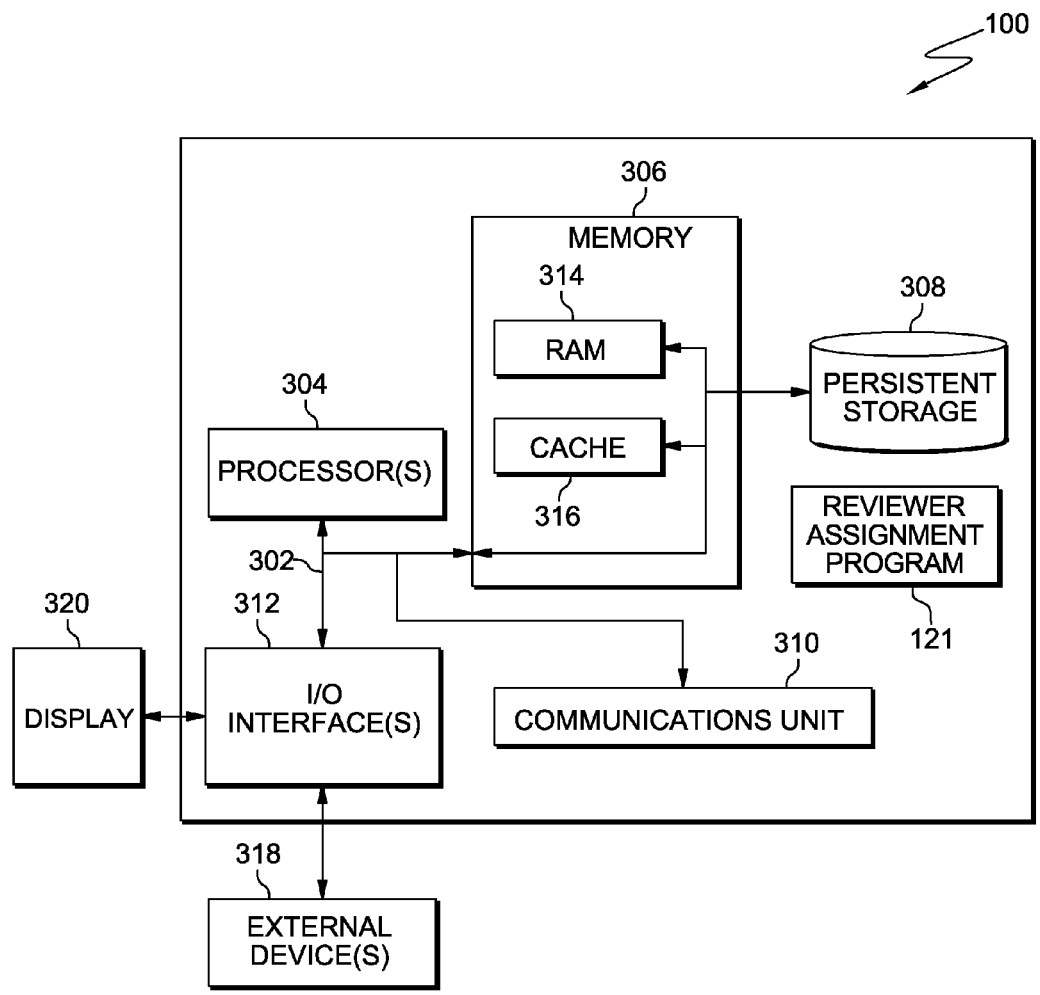
FIG. 3 depicts a block diagram of components of the server computer executing the reviewer assignment program, in accordance with an embodiment of the present invention.

FIG. 3 depicts a block diagram of components of server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Reviewer assignment program 121, file storage 142, and records database 122 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including user computing devices 130, 140, and 150. In these examples, communications unit 310 includes one or more network interface cards. Communications unit 310 may provide communications through the use of either or both physical and wireless communications links. Reviewer assignment program 121, file storage 142, and records database 122 may be downloaded to persistent storage 308 through communications unit 310.

I/O interface(s) 312 allows for input and output of data with other devices that may be connected to server computer 120. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., reviewer assignment program 121, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing reviews of a computing file, the method comprising:
   a computer receiving a computing file, the computing file containing one or more software program functions;
   the computer receiving a list of one or more reviewers to review the computing file;
   the computer parsing the computing file, wherein parsing includes identifying and separating the one or more software program functions, wherein the one or more software program functions are defined by a function statement using a name, a list of parameters, and a command block that defines a capability of each of the one or more software program functions;

the computer receiving an assignment of at least one of the one or more reviewers to at least one of the one or more software program functions within the computing file;

the computer filtering the computing file by both the one or more reviewers and the one or more software program functions, wherein filtering includes creating a listing of the one or more software program functions, a listing of the one or more reviewers, and a listing of each of the one or more reviewers assigned to each of the one or more software program functions;

the computer sending a request to review the at least one of the one or more software program functions to the at least one of the one or more reviewers assigned; and responsive to receiving one or more reviewer comments from at least one of the one or more reviews, the computer updates a status for the computing file based, at least in part, on the one or more reviewer comments, wherein the status for the computing file include not reviewed, reviewed, and completed.

2. The method of claim 1, wherein the computer sending a request to review the at least one of the one or more software program functions to the at least one of the one or more reviewers assigned, further comprises the computer sending an electronic communication to the at least one of the one or more reviewers, the electronic communication identifying the at least one of the one or more software program functions assigned to the at least one of the one or more reviewers.

3. The method of claim 2, wherein the electronic communication includes one or more of: an e-mail, an instant message or a text message.

4. The method of claim 1, further comprising:
creating a record, the record including one or more of: reviewer name, reviewer electronic identification, file name, and file identification; and
responsive to receiving an assignment of at least one of the one or more reviewers to at least one of the one or more software program functions within the computing file, updating the record.

5. The method of claim 1, further comprising:
receiving one or more reviewer comments, the one or more reviewer comments identified by one or more of: a reviewer name, a reviewer identification, a file name, a software program function, a text line, and a date or a time.

6. A computer program product for managing reviews of a computing file, the computer program product comprising:
one or more computer-readable storage media and program instructions stored on the one or more computer-readable storage media, the program instructions comprising:
program instructions to receive a computing file, the computing file containing one or more software program functions;
program instructions to receive a list of one or more reviewers to review the computing file;
program instructions to parse the computing file, wherein parsing includes identifying and separating the one or more software program functions, wherein the one or more software program functions are defined by a function statement using a name, a list of parameters, and a command block that defines a capability of each of the one or more software program functions;

program instructions to receive an assignment of at least one of the one or more reviewers to at least one of the one or more software program functions within the computing file;

program instructions to filter the computing file by both the one or more reviewers and the one or more software program functions, wherein filtering includes creating a listing of the one or more software program functions, a listing of the one or more reviewers, and a listing of each of the one or more reviewers assigned to each of the one or more software program functions;

program instructions to send a request to review the at least one of the one or more software program functions to the at least one of the one or more reviewers assigned; and responsive to receiving one or more reviewer comments from at least one of the one or more reviews, program instructions to update a status for the computing file based, at least in part, on the one or more reviewer comments, wherein the status for the computing file include not reviewed, reviewed, and completed.

7. The computer program product of claim 6, wherein the program instructions to send a request to review the at least one of the one or more software program functions to the at least one of the one or more reviewers assigned, further comprises the computer sending an electronic communication to the at least one of the one or more reviewers, the electronic communication identifying the at least one of the one or more software program functions assigned to the at least one of the one or more reviewers.

8. The computer program product of claim 7, wherein the electronic communication includes one or more of: an e-mail, an instant message or a text message.

9. The computer program product of claim 6, further comprising:
program instructions to create a record, the record including one or more of: reviewer name, reviewer electronic identification, file name, and file identification; and
responsive to receiving an assignment of at least one of the one or more reviewers to at least one of the one or more software program functions within the computing file, program instructions to update the record.

10. The computer product of claim 6, further comprising program instructions to receive one or more reviewer comments, the one or more reviewer comments identified by one or more of: a reviewer name, a reviewer identification, a file name, a software program function, a text line, and a date or a time.

11. A computer system for managing reviews of a computing file, the computer system comprising:
one or more computer processors;
one or more computer-readable storage media;
program instructions stored on the computer-readable storage media for execution by at least one of the one or more processors, the program instructions comprising:
program instructions to receive a computing file, the computing file containing one or more software program functions;
program instructions to receive a list of one or more reviewers to review the computing file;
program instructions to parse the computing file, wherein parsing includes identifying and separating the one or more software program functions, wherein the one or more software program functions are defined by a function statement using a name, a list of parameters, and a command block that defines a capability of each of the one or more software program functions;

program instructions to receive an assignment of at least one of the one or more reviewers to at least one of the one or more software program functions within the computing file;

program instructions to filter the computing file by both the one or more reviewers and the one or more software program functions, wherein filtering includes creating a listing of the one or more software program functions, a listing of the one or more reviewers, and a listing of each of the one or more reviewers assigned to each of the one or more software program functions;

program instructions to send a request to review the at least one of the one or more software program functions to the at least one of the one or more reviewers assigned; and responsive to receiving one or more reviewer comments from at least one of the one or more reviews, program instructions to update a status for the computing file based, at least in part, on the one or more reviewer comments, wherein the status for the computing file include not reviewed, reviewed, and completed.

12. The computer system of claim 11, wherein the program instructions to send a request to review the at least one of the one or more software program functions to the at least one of the one or more reviewers assigned, further comprises the computer sending an electronic communication to the at least one of the one or more reviewers, the electronic communication identifying the at least one of the one or more software program functions assigned to the at least one of the one or more reviewers.

13. The computer system of claim 11, further comprising:
program instructions to create a record, the record including one or more of: reviewer name, reviewer electronic identification, file name, and file identification; and
responsive to receiving an assignment of at least one of the one or more reviewers to at least one of the one or more software program functions within the computing file, program instructions to update the record.

14. The computer system of claim 11, further comprising program instructions to receive one or more reviewer comments, the one or more reviewer comments identified by one or more of: a reviewer name, a reviewer identification, a file name, a software program function, a text line, and a date or a time.

* * * * *